United States Patent Office 3,542,772
Patented Nov. 24, 1970

3,542,772
CYANINE DYES CONTAINING A 1-HETEROCYCLIC SUBSTITUTED 4-PYRAZOLYL NUCLEUS
Earl J. Van Lare, Rochester, N.Y., assignor to Eastman Kodak Company, Rochester, N.Y., a corporation of New Jersey
No Drawing. Filed Dec. 23, 1966, Ser. No. 604,181
Int. Cl. C09b 23/10
U.S. Cl. 260—240.1
15 Claims

ABSTRACT OF THE DISCLOSURE

Cyanine dyes are provided which contain a 1-heterocyclic substituted 4-pyrazole nucleus. Novel 1-heterocyclic substituted 4-pyrazole aldehydes are provided, and are reacted with quaternary compounds to form the subject dyes.

---

This invention relates to novel photographic materials, and more particularly to a new class of cyanine dyes containing a 4-pyrazole nucleus having a heterocyclic substituent in the 1-position thereof that are especially useful as electron acceptors and spectral sensitizers for direct positive photographic silver halide emulsions, and to means for preparing such new dyes. Novel dye intermediates are also provided.

It is known that direct positive images can be obtained with certain types of photographic silver halide emulsions. For example, photographic emulsions have been proposed for this purpose comprising an electron acceptor and silver halide grains that has been fogged with a combination of a reducing agent and a compound of a metal more electropositive than silver. One of the advantages of such direct positive emulsions is that the highlight areas of the images obtained with these materials are substantially free from fog. However, known materials of this type have not exhibited the high speed required for many applications of photography. Also, such known materials have not shown the desired selective sensitivity, especially to radiation in the green to red region of the spectrum. It is evident, therefore, that there is need in the art for improved direct positive photographic materials having both good speed and desirable sensitivity to longer wavelength radiations.

I have now found that certain cyanine dyes containing certain pyrazole nuclei are outstanding electron acceptors and spectral sensitizers in direct positive type photographic silver halide emulsions. They provide superior reversal systems, especially with fogged silver halide emulsions that are characterized by both good speed and desired sensitivity to radiation in the green to red region of the spectrum, with maximum sensitivity occurring in most cases in the region of about 460–550 mµ. The images produced with these new direct positive photographic emulsions are clear and sharp.

It is, accordingly, an object of this invention is provide a new class of cyanine dyes. Another object of this invention is to provide new cyanine dyes that function as electron acceptors and spectral sensitizers for photographic silver halide emulsions, and more particularly for direct positive photographic emulsions, especially fogged emulsions of this type. Still another object is to provide means for preparing the new cyanine dyes of this invention. A further object is to provide novel dye intermediates. Other objects of this invention will be apparent from this disclosure and the appended claims.

The new class of cyanine dyes of the invention include those comprising two nitrogen heterocyclic nuclei joined by methine linkage; the first of said nuclei being a pyrazole nucleus joined through the 4-carbon atom thereof to said methine linkage and having substituted in the 1-position thereof a heterocyclic nucleus containing from 5 to 6 atoms in the heterocyclic ring, at least one of said atoms being nitrogen; said second nucleus being joined through a carbon thereof to said methine linkage. Preferably, the methine linkage is a dimethine linkage or a tetramethine linkage.

One highly useful class of the novel cyanine dyes of the invention include those represented by the following general formula:

I. 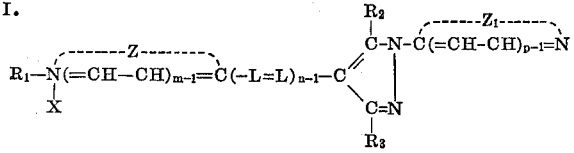

wherein $m$ and $p$ each represents a positive integer of from 1 to 2; $n$ represents a positive integer of from 2 to 3; $L$ represents a methine linkage, e.g., —CH=,

—C(CH$_3$)=

—C(C$_6$H$_5$)=, etc.; R$_1$ represents an alkyl group (preferably a lower alkyl containing from 1 to 4 carbon atoms), e.g., methyl, ethyl, propyl, isopropyl, butyl, hexyl, cyclohexyl, decyl, dodecyl, etc., a hydroxyalkyl group, e.g., β-hydroxyethyl, ω-hydroxybutyl, etc., an alkoxyalkyl group, e.g., β-methoxyethyl, ω-butoxybutyl, etc., a carboxyalkyl group, e.g., β-carboxyethyl, ω-carboxybutyl, etc., a sulfoalkyl groups, e.g., β-sulfoethyl, ω-sulfobutyl, etc., a sulfatoalkyl group, e.g., β-sulfatoethyl, ω-sulfatobutyl, etc., an acyloxyalkyl group, e.g., β-acetoxyethyl, γ-acetoxypropyl, ω-butyrylyoxybutyl, etc., an alkoxycarbonylalkyl group, e.g., β-methoxycarbonylethyl, ω-ethoxycarbonylbutyl, benzyl, phenylethyl, etc., and the like, or an alkenyl group, e.g., allyl, 1-propenyl, 2-butenyl, etc., or an aryl group, e.g., phenyl, tolyl xylyl, methoxyphenyl, chlorophenyl, naphthyl, etc; R$_2$ and R$_3$ each represents a hydrogen atom, or an alkyl group (preferably a lower alkyl containing from 1 to 4 carbon atoms), e.g., methyl, ethyl, propyl, isopropyl, butyl, hexyl, cyclohexyl, decyl, dodecyl, etc., or an aryl group, e.g., phenyl, tolyl, xylyl, methoxyphenyl, chlorophenyl, naphthyl, etc.; X represents an acid anion, e.g., chloride, bromide, iodide, thiocyanate, sulfamate, perchlorate, p-toluenesulfonate, methyl sulfate, ethyl sulfate, etc.; Z$_1$ represents the nonmetallic atoms required to complete a heterocyclic nucleus containing from 5 to 6 atoms in the heterocyclic ring, which nucleus may contain a second hetero atom such as oxygen, sulfur, selenium, or nitrogen, such as the following nuclei: a thiazole nucleus, e.g., thiazole, 4-methyl thiazole, 4-phenylthiazole, 5-methylthiazole, 5-phenylthiazole, 4,5-dimethylthiazole, 4,5-diphenylthiazole, 4-(2-thienyl)thiazole, benzothiazole, 4-chlorobenzothiazole, 4-nitrothiazole, 5-chlorobenzothiazole, 6-chlorobenzothiazole, 7-chlorobenzothiazole, 4-methylbenzothiazole, 5-methylbenzothiazole, 6-methylbenzothiazole, 5-nitrobenzothiazole, 6-nitrobenzothiazole, 5-bromobenzothiazole, 6-bromobenzothiazole, 5-chloro-6-nitrobenzothiazole, 6-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-dioxymethylenebenzothiazole, 5-hydroxybenzothiazole, 6-hydroxybenzothiazole, α-naphthothiazole, β-naphthothiazole, 5-methoxy-β-naphthothiazole, 5-ethoxy-β-naphthothiazole, 8-methoxy-α-naphthothiazole, 7-methoxy-α-naphthothiazole, 4'-methoxythianaphtheno-7',6',4,5-thiazole, etc., nitro group substituted naphthothiazoles; an oxazole nucleus, e.g., 4-methyloxazole, 4-nitrooxazole, 5-methyloxazole, 4-phenyloxazole, 4,5-diphenyloxazole, 4-ethyloxazole, 4,5-dimethyloxazole, 5- phenyloxazole, benzoxazole, 5-chlorobenzoxazole, 5-methylbenzoxazole, 5-phenylbenzoxazole, 5- or 6-nitrobenzoxazole, 5-chloro-6-nitrobenzoxazole, 6-methylbenzoxazole, 5,6-dimethylbenzoxazole, 4,6-dimethylbenzoxazole, 5-methoxybenzoxazole, 5-ethoxybenzoxazole, 5-chlorobenzoxazole, 6-methoxybenzoxazole, 5-hydroxybenzoxazole, 6-hydroxybenzoxazole, α-naphthoxazole, β-naphthoxazole, nitro group substituted naphthoxazoles, etc.; a selenazole nucleus, e.g., 4-methylselenazole, 4-nitroselenazole, 4-phenylselenazole, benzoselenazole, 5-chlorbenzoselenazole, 5-methoxybenzoselenazole, 5-hydroxybenzoselenazole, 5- or 6-nitrobenzoselenazole, 5-chloro-6-nitrobenzoselenazole, tetrahydrobenzoselenazole, α-naphthoselenazole, β-naphthoselenazole, nitro group substituted naphthoselenazoles, etc.; a thiazoline nucleus, e.g., thiazoline, 4-methylthiazoline, 4-nitrothiazoline, etc.; a pyridine nucleus, e.g., 2-pyridine, 5-methyl-2-pyridine, 4-pyridine, 3-methyl-4-pyridine, nitro group substituted pyridines, etc.; a quinoline nucleus, e.g., 2-quinoline, 3-methyl-2-quinoline, 5-ethyl-2-quinoline, 6-chloro-2-quinoline, 6-nitro-2-quinoline, 8-chloro-2-quinoline, 6-methoxy-2-quinoline, 8-ethoxy-2-quinoline, 8-hydroxy-2-quinoline, 4-quinoline, 6-methoxy-4-quinoline, 6-nitro-4-quinoline, 7-methyl-4-quinoline, 8-chloro-4-quinoline, 1-isoquinoline, 6-nitro-1-isoquinoline, 3,4-dihydro-1-isoquinoline, 3-isoquinoline, etc.; a 3,3-dialkylindolenine nucleus, preferably having a nitro or cyano substituent, e.g., 3,3-dimethyl-5 or 6-nitroindolenine, 3,3-dimethyl-5 or 6-cyanoindolenine, etc.; and, an imidazole nucleus, e.g., imidazole, 1-alkylimidazole, 1-alkyl-4-phenylimidazole, 1-alkyl-4,5-dimethylimidazole, benzimidazole, 1-alkylbenzimidazole, 1-aryl-5,6-dichlorobenzimidazole, 1-alkyl-α-naphthimidazole, 1-aryl-β-naphthimidazole, 1-alkyl-5-methoxy-α-naphthimidazole, etc.; and Z represents the non-metallic atoms required to complete a heterocyclic nucleus containing from 5 to 6 atoms in the heterocyclic ring, which nucleus may contain a second hetero atom such as oxygen, sulfur, selenium or nitrogen, selected from the class including those of above defined $Z_1$, an imidazo[4,5-b]quinoxaline nucleus, e.g., imidazo[4,5-b]quinoxaline, 1,3-dialkylimidazo[4,5-b]quinoxaline such as 1,3-dietylimidazo[4,5-b]quinoxaline, 6-chloro-1,3-diethylimidazo[4,5-b]quinoxaline- etc., 1,3-dialkenylimidazo[4,5-b]quinoxaline such as 1,3-diallylimidazo[4,5-b]quinoxaline, 6-chloro-1,3-diallylimidazo[4,5-b]quinoxaline, etc., 1-3-diarylimidazo[4,5-b]quinoxaline such as 1,3-diphenylimidazo[4,5-b]quinoxaline, 6-chloro-1,3-diphenylimidazo[4,5-b]quinoxaline, etc.; a 3,3-dialkyl-3-H-pyrrolo[2,3-b]pyridine nucleus, e.g., 3,3-dimethyl-3H-pyrrolo[2,3-b]pyridine, 3,3-diethyl-3H-pyrrolo[2,3-b]pyridine, etc.; a thiazolo[4,5-b]quinoline nucleus, and the like. The nuclei wherein Z in above Formula I represents the atoms necessary to complete a desensitizing nucleus, such as a nitro substituted heterocyclic nucleus, form patricularly efficacious desensitizing dyes and are the preferred dye species of the invention.

The cyanine dyes of the invention are powerful desensitizers for preparing direct positive photographic silver halide emulsions. They are also useful desensitizers for negative type of photographic emulsions. In addition, they are also useful desensitizers in emulsions used in the process described in Stewart and Reeves, U.S. Pat. No. 3,250,618, issued May 10, 1966.

As used herein and in the appended claims, "desensitizing nucleus" refers to those nuclei which, when converted to a symmetrical carbocyanine dye and added to a gelatin silver chlorobromide emulsion containing 40 mole percent chloride and 60 mole percent bromide, at a concentration of from 0.01 to 0.2 gram dye per mole of silver, caused by electron trapping at least about an 80 percent loss in the blue speed of the emulsion when sensitometrically exposed and developed three minutes in Kodak developer D–19 at room temperature. Advantageously, the desensitizing nuclei are those which, when converted to a symmetrical carbocyanine dye and tested as just described, essentially completely desensitize the test emulsion to blue radiation (i.e., cause more than about 90 to 95% loss of speed to blue radiation).

The cyanine dyes defined by Formula I above are conveniently prepared by heating a mixture of (1) a heterocyclic quaternary salt compound of the formula:

II. 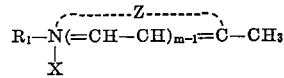

wherein $m$, $R_1$ X and Z are as previously defined and (2) a pyrazole compound of the formula:

III. 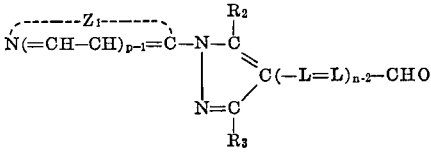

wherein $n$, $p$, L, $R_2$, $R_3$ and $Z_1$ are as previously defined, in approximately equimolar proportions, in the presence of a condensing agent if desired, such as anyhdrous sodium acetate, a trialkylamine such as triethylamine, etc., piperidine, N-methylpiperidine, etc., in an inert solvent meduim such as ethanol, acetic anhydride, glacial acetic acid, etc. The crude dyes are then separated from the reaction mixtures and purified by one or more recrystalllizations from appropriate solvents such as benzene, petroleum ether, ethanol, methanol, etc. The 4-pyrazole aldehydes (e.g., carboxaldehyde or acrylaldehyde) substituted in the 1position with a nitrogen containing heterocyclic ring of from 5 to 6 atoms, such as the compounds of Formula III above, are new and useful compositions of matter.

In the preparation of direct positive photographic silver halide emulsions, one or more of the new dyes of the invention as defined by Formula I above, are incorporated into a suitable fogged silver halide emulsion. The emulsion can be fogged in any suitable manner, such as by light or with chemical fogging agents, e.g., stannous chloride, formaldehyde, thiourea dioxide and the like. The emulsion may be fogged by the addition thereto of a reducing agent such as thlourea dioxide and a compound of a metal more electropositive than silver such as a gold salt, for example, potassium chloroaurate, as described in British Pat. 723,019 (1955).

Typical reducing agents that are useful in providing such emulsions include stannous salts, e.g., stannous chloride, hydrazine, sulfur compounds such as thiourea dioxide, phosphonium salts such as tetra (hydroxymethyl) phosphonium chloride, and the like. Typical useful metal compounds that are more electropositive than silver include gold, rhodium, platinum, palladium, iridium, etc., preferably in the form of soluble salts thereof, e.g., potassium chloroaurate, auric chloride, $(NH_4)_2PdCl_6$ and the like.

The concentration of added dye can vary widely, e.g., from about 50 to 2000 mg. and preferably from about 400 to 800 mg. per mole of silver halide in the direct positive emulsions.

As used herein, and in the appended claims, "fogged" refers to emulsions containing silver halide grains which produce a density of at least 0.5 when developed, without exposure, for 5 minutes at 68° F. in developer Kodak DK–50 having the composition set forth below, when the emulsion is coated at a silver coverage of 50 mg. to 500 mg. per square foot.

DEVELOPER

N-methyl-p-aminophenol sulfate: 2.5 g.
Sodium sulfite (anhydrous): 30.0 g.
Hydroquinone: 2.5 g.
Sodium metaborate: 10.0 g.
Potassium bromide: 0.5 g.
Water to make 1.0 l.

The dyes of this invention are also advantageously incorporated in direct positive emulsions of the type in which a silver halide grain has a water-insoluble silver salt center and an outer shell composed of a fogged water-insoluble silver salt that develops to silver without exposure. The dyes of the invention are incorporated, preferably, in the outer shell of such emulsions. These emulsions can be prepared in various ways, such as those described in Berriman U.S. patent application Ser. No. 448,467, filed Apr. 15, 1965 now U.S. Pat. 3,367,778 issued Feb. 6, 1968. For example, the shell of the grains in such emulsions may be prepared by precipitating over the core grains a light-sensitive water-insoluble silver salt that can be fogged and which fog is removable by bleaching. The shell is of sufficient thickness to prevent access of the developer used in processing the emulsions of the invention to the core. The silver salt shell is surface fogged to make developable to metallic silver with conventional surface image developing compositions. The silver salt of the shell is sufficiently fogged to produce a density of at least about 0.5 when developed for 6 minutes at 68° F. in Developer A below when the emulsion is coated at a silver coverage of 100 mg. per square foot. Such fogging can be effected by chemically sensitizing to fog with the sensitizing agents described for chemically sensitizing the core emulsion, high intensity light and the like fogging means well known to those skilled in the art. While the core need not be sensitized to fog, the shell is fogged. Fogging by means of a reduction sensitizer, a noble metal salt such as gold salt plus a reduction sensitizer, a sulfur sensitizer, high pH and low pAg silver halide precipitating conditions, and the like can be suitably utilized. The shell portion of the subject grains can also be coated prior to fogging.

DEVELOPER A

N-methyl-p-aminophenol sulfate: 2.5 grams.
Ascorbic acid: 10.0 grams.
Potassium metaborate: 35.0 grams.
Potassium bromide: 1.0 gram.
Water to 1 liter.
pH of 9.6.

Before the shell of water-insoluble silver salt is added to the silver salt core, the core emulsion is first chemically or physically treated by methods previously described in the prior art to produce centers which promote the deposition of photolytic silver, i.e., latent image nucleating centers. Such centers can be obtained by various techniques as described herein. Chemical sensitization techniques of the type described by Antoine Hautot and Henri Saubeneir in Science et Industries Photographiques, vol. XXVIII, January 1957, pages 1 to 23 and January 1957, pages 57 to 65 are particularly useful. Such chemical sensitization includes three major classes, namely, gold or noble metal sensitization, sulfur sensitization, such as by a labile sulfur compound, and reduction sensitization, e.g., treatment of the silver halide with a strong reducing agent which introduces small specks of metallic silver into the silver salt crystal or grain.

In the preparation of the above photographic emulsions, the dyes, reducing agents and metal compounds of the invention are advantageously incorporated in the washed, finished silver halide emulsion and should, of course, be uniformly distributed throughout the emulsion. The methods of incorporating dyes and other addenda in emulsions are relatively simple and well known to those skilled in the art of emulsion making. For example, it is convenient to add them from solutions in appropriate solvents, in which case the solvent selected should be completely free from any deleterious effect on the ultimate light-sensitive materials. Methanol, isopropanol, pyridine, water, etc., alone or in admixtures, have proven satisfactory as solvents for this purpose. The type of silver halide emulsions that can be sensitized with the new dyes include any of those prepared with hydrophilic colloids that are known to be satisfactory for dispersing silver halides, for example, emulsions comprising natural materials such as gelatin, albumin, agar-agar, gum arabic, alginic acid etc. and hydrophilic synthetic resins such as polyvinyl alcohol, polyvinyl pyrrolidone, cellulose ethers, partially hydrolyzed cellulose acetate, and the like.

The dyes, reducing agents and metal compounds of the invention can be used with emulsions prepared with any of the light-sensitive silver halide salts including silver chloride, silver bromide, silver chlorobromide, silver bromoiodide, silver chlorobromoiodide, etc. Particularly useful for direct positive fogged emulsions are those in which the silver salt is a silver bromohalide comprising more than 50 mole percent bromide. As indicated previously, certain dyes of this invention are also useful in emulsions which contain color formers. This is unexpected since related prior art dyes cannot be used in emulsions containing a color former.

The novel emulsions of this invention may be coated on any suitable photographic support, such as glass, film base such as cellulose acetate, cellulose acetate butyrate, polyesters such as polyethylene terephthalate, paper, baryta coated paper, polyolefin coated paper, e.g., polyethylene or polypropylene coated paper, which may be electron bombarded to promote emulsion adhesion, to produce the novel photographic elements of the invention.

The invention is further illustrated by the following examples.

EXAMPLE 1

2-{[1-(2-benzothiazolyl)-3,5-dimethyl-4-pyrazolyl]vinyl}-3-ethylbenzothiazolium iodide

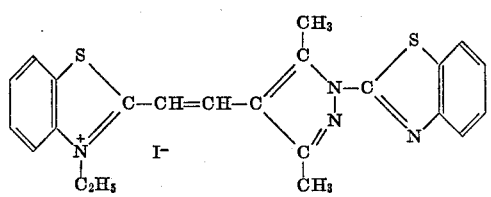

A mixture of 1.5 g. (1 mol.) of 3-ethyl-2-methylbenzothiazolium iodide, 1,3 g. (1 mol.) of 1-(2-benzothiazolyl)-3,5-dimethyl-4-pyrazole carboxaldehyde, 1,2 g. (1 mol.+200% excess) of anhydrous sodium acetate, and 10 ml. of ethyl alcohol was refluxed one hour. The reaction mixture was chilled, and the crude dye was collected on a filter and washed with water. After recrystallization from methyl alcohol, 0.4 g. (15%) of pure dye was obtained as tan crystals, M.P. 271–272° C., decomposes.

The above prepared dye containing a sensitizing benzothiazolium salt nucleus was photographically tested as an electron acceptor and spectral sensitizer for fogged direct positive photographic materials as follows:

A gelatin silver bromoiodide emulsion is reduction and gold sensitized, i.e., fogged, by first adding stannous chloride and heating for 60 minutes at 55° C. and then adding potassium chloroaurate and heating for 20 minutes at 55° C., as described in British Pat. 723,019. The above prepared dye, 2-{[1-(2-benzothiazolyl)-3,5-dimethyl-4-pyrazolyl]} - 3 - ethylbenzothiazolium iodide is then added to the above fogged emulsion in amount sufficient to give a concentration of 0.35 grams of the dye per mole of silver. The resulting emulsion is then coated on a cellulose acetate film support at a coverage of 100 mg. of silver and 400 mg. of gelatin per square foot of support.

A sample of the coated support is then exposed on an Eastman Ib sensitometer using a tungsten light source and processed for 6 minutes at room temperature in Kodak D-19 developer which has the following composition:

N-methyl-p-aminophenol sulfate: 2.0 g.
Sodium sulfite (anhydrous): 90.0 g.
Hydroquinone: 8.0 g.
Sodium carbonate (monohydrate): 52.5 g.
Potassium bromide: 5.0 g.
Water to make 1.0 liter.

then fixed, washed and dried. The results are listed in Table I hereinafter. Referring thereto, it will be seen that the dye of this example has a minimum density in exposed areas of only 0.04, a sensitivity maximum at 468 mμ, whereas the control sample similarly prepared and tested but containing no spectral sensitizing dye increases in density with exposure. This result indicates that the dye compound of the above example is especially well suited to function as both an electron acceptor and spectral sensitizer. It thus provides excellent quality direct positive photographic silver halide emulsions. Excellent magenta images are obtained when the color former 1 - (2,4,6 - trichlorophenyl)3,3'-(2'',4''-di-t-amylphenoxyacetamido)benzimidazo-5-pyrazolone is incorporated in the emulsion of this example, the emulsion is coated on a support, exposed to a tungsten source through Wratten filter No. 61 and No. 16, and reversal processed as described in Graham et al. U.S. Pat. 3,046,129, issued July 24, 1962, in Example (a) col. 27, lines 27 et seq. except that black-and-white (MQ) development is omitted, the color development is reduced to one minute and is conducted in total darkness until after fixing.

In place of the 3-ethyl-2-methylbenzothiazolium iodide in the above example, there can be substituted an equivalent amount of other intermediates such as a 3-alkyl (e.g., methyl, ethyl, propyl, isopropyl, butyl, hexyl, decyl, dodecyl, etc.)-2-methylbenzoxazolium quaternary salt, e.g., the chloride, bromide, iodide, perchlorate, p-toluenesulfonate, etc., salt, or a 3-alkyl (e.g., methyl, ethyl, butyl, dodecyl, etc.)-2-methylbenzoselenazolium quaternary salt, e.g., the chloride, bromide, iodide, perchlorate, p-toluenesulfonate, etc., and the like, to give the corresponding cyanine dyes having generally similar properties as electron acceptors and spectral sensitizers for direct positive and fogged direct positive photographic silver halide emulsions, for example, the dye 2-{[1-(2-benzothiazolyl)-3,5-dimethyl-4-pyrazolyl]vinyl}-3-ethylbenzoxazolium iodide, the dye 2-{[1-(2-benzothiazolyl) - 3,5 - dimethyl - 4 - pyrazolyl]vinyl}-3-ethylbenzoselenazolium iodide, or other salts of these dyes such as the chloride, bromide, perchlorate, p-toluenesulfonate, etc.

Also, the 1 - (2-benzothiazolyl) - 3,5 - dimethyl-4-pyrazole carboxyaldehyde intermediate in the above example can be substituted with, for example, 1 - (2-benzoxazolyl) - 3,5-dimethyl-4-pyrazole carboxaldehyde to give the compound 2-{[1-(2-benzoxazolyl) - 3,5-dimethyl - 4-pyrazolyl]vinyl} - 3 - ethylbenzothiazolium iodide, or with 1-(2-benzoselenazolyl) - 3,5-dimethyl-4-pyrazole carboxaldehyde to give the dye compound 2-{[1-(2-benzoselenazolyl) - 3,5 - dimethyl-4-pyrazolyl]vinyl}-3 - ethylbenzothiazolium iodide or 1 - (2-benzothiazolyl)-3,5-dimethyl - 4 - pyrazole acrylaldehyde to give the dye 2-{[1-(2-benzothiazolyl) - 3,5-dimethyl-4-pyrazolyl]butadienyl} - 3 - ethylbenzothiazolium iodide, etc., which dyes likewise have generally similar electron acceptor and spectral sensitizing properties for direct positive and fogged direct positive photographic emulsions.

It will apparent from the foregoing that still other related densensitizing dyes can be prepared in accordance with the procedure of above Example 1 by appropriate selection of the various mentioned intermediates.

For comparison purposes, the following Example A, which is of similar structure to that of Example 1, except for having a phenyl substituent on the 1-position of the pyrazole nucleus, is included herein.

EXAMPLE A

2-[(3,5-dimethyl-1-phenyl-4-pyrazolyl)vinyl]-3-ethylbenzothiazolium iodide

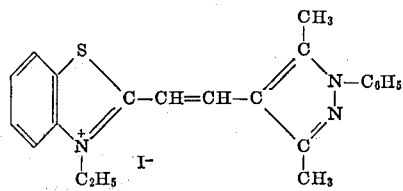

A mixture of 1.5 g. (1 mol.) of 3-ethyl-2-methylbenzothiazolium iodide, 1 g. (1 mol.) of 3,5 - dimethyl-1-phenyl-4-pyrazole carboxaldehyde, 1.2 g. (1 mol.+200% excess) of anhydrous sodium acetate, and 10 ml. of ethyl alcohol was refluxed for one hour. After adding 100 ml. of water and chilling, a reddish tar was separated from the supernatant liquor by decantation. The tar was treated with 100 ml. of chloroform and chilled. The crude dye was collected on a filter and washed with chloroform. The dye was purified by recrystallization from methyl alcohol. A yield of 0.9 g. (38%) of pure dye was obtained as bright yellow crystals, M.P. 225–226° C., dec.

*Analysis.*—Calc'd. for $C_{22}H_{22}IN_3S$ (percent): I, 26.05. Found (percent): I, 26.3.

The above dye was photographically tested by the exact procedure described in above Example 1. The results are shown in Table 1 hereinafter. Referring to the table, it will be seen that the dye of Example A had a relative speed of only 191 as compared with 380 for the dye of Example 1. It will be further noted that the dye of Example A had a maximum density in the unexposed areas of only 1.50 and a relatively high minimum density in the exposed areas of 0.14, whereas the dye of Example 1 showed densities of 1.74 and 0.04, respectively, thereby indicating a marked superiority in contrast over that of Example A. The maximum sensitization for Example A was 455 mμ, while that of Example 1 was slightly higher at 468 mμ. Accordingly, these results indicate that the dye of Example 1 containing the 2-benzothiazolyl substituent in the 1-position of the pyrazole nucleus is markedly superior to similar dyes containing just the phenyl substituent in the 1-position of the pyrazole nucleus, as exemplified by above Example A, as an electron acceptor and spectrol sensitizer for fogged direct positive photographic silver halide emulsions.

EXAMPLE 2

2-{[1-(2-benzothiazolyl)-3,5-dimethyl-4-pyrazolyl]vinyl}-1,3,3-trimethyl-3H-indolium iodide

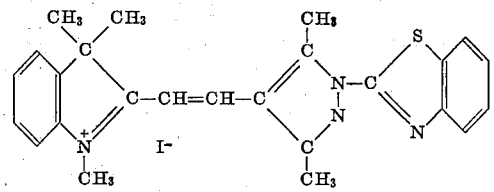

A mixture of 1.5 g. (1 mol.) of 1,2,3,3-tetramethyl-3H-indolium iodide, 1.3 g. (1 mol.) of 1-(2-benzothiazolyl)-3,5 - dimethyl - 4 - pyrazole carboxaldehyde, 1 g. (1 mol.+150% excess) of anhydrous sodium acetate, and 10 ml. of ethyl alcohol was refluxed one hour. The reaction mixture was chilled and the crude dye collected on a filter and washed with water. After recrystallization from methyl alcohol, 0.55 g. (20%) of pure dye was obtained as tan plates, M.P. 276–277° C., dec.

The above prepared dye containing a sensitizing 3H-indolium salt nucleus was photographically tested by the exact procedure of Example 1. The results shown in Table 1 hereinafter indicate that this dye is a good electron acceptor and spectral sensitizer, markedly superior to the dye of Example A, for fogged direct positive photographic emulsions.

In place of the 1-(2-benzothiazolyl) - 3,5 - dimethyl-4-pyrazole carboxaldehyde in the above example, there can be substituted an equivalent amount of, for example, 1-(2-benzoxazolyl) - 3,5 - dimethyl-4-pyrazole carboxaldehyde to give the dye 2-{[1-(2-benzoxazolyl)-3,5-dimethyl - 4 - pyrazolyl]vinyl} - 1,3,3 - trimethyl-3H-indolium iodide, or 1-(2-benzoselenazolyl)-3,5-dimethyl-4-pyrazole carboxaldehyde to give the dye 2 - {[1-(2-benzoselenazolyl)-3,5-dimethyl - 4 - pyrazolyl]vinyl}-1,3,3-trimethyl-3H-indolium iodide, etc., which dyes have generally similar electron acceptor and spectral sensitizer properties for use in fogged direct positive photographic silver halide emulsions.

EXAMPLE 3

2-{[1-(2-benzothiazolyl)-3,5-dimethyl-4-pyrazolyl]vinyl}-1-ethylquinolinium iodide

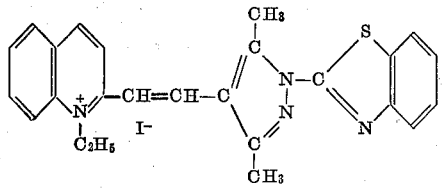

A mixture of 1.5 g. (1 mol.) of 1-ethylquinaldinium iodide, 1.3 g. (1 mol.) of 1-(2-benzothiazolyl)-3,5-dimethyl-4-pyrazole carboxaldehyde, 10 ml. of ethyl alcohol, and 3 drops of piperidine was refluxed one hour. The reaction mixture was cooled and treated with 30 ml. of water. The crude dye was collected on a filter and washed with water. After recrystallization from methyl alcohol, 0.1 g. (4%) of pure dye was obtained as dull yellow crystals, M.P. 277–278° C., dec.

This dye containing a sensitizing quinolinium salt nucleus was photographically tested in accordance with the exact procedure of Example 1 and found, as shown in Table 1 hereinafter, to be an excellent desensitizing dye, markedly superior to the dye of Example A, for preparing fogged direct positive photographic emulsions.

In place of the 1-(2-benzothiazolyl)-3,5-dimethyl-4-pyrazolyl carboxaldehyde in the above example, there can be substituted an equivalent molar amount of 1-(2-benzoxazolyl)-3,5-dimethyl-4-pyrazole carboxaldehyde to give the dye 2-{[1-(2-benzoxazolyl)-3,5-dimethyl-4-pyrazolyl]vinyl}-1-ethylquinolium iodide, or 1-(2-benzoselenazolyl)-3,5-dimethyl-4-pyrazole carboxaldehyde to give the dye 2-{[1-(2-benzoselenazolyl)-3,5-dimethyl-4-pyrazolyl]vinyl}-1-ethylquinolium iodide, which dyes have generally similar properties as electron acceptors and spectral sensitizers for fogged direct positive photographic emulsions.

EXAMPLE 4

1,3-diallyl-2-{[1-(2 - benzothiazolyl) - 3,5 - dimethyl-4-pyrazolyl]vinyl}imidazo[4,5-b]quinoxalinium p - toluenesulfonate

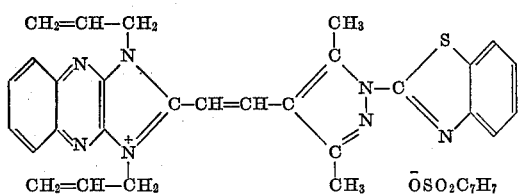

A mixture of 4.4 g. (1 mol.) of 1,3-diallyl-2-methyl-imidazo[4,5-b]quinoxalnium p-toluenesulfonate, 2,6 g. (1 mol.) of 1-(2-benzothiazolyl) - 3,5 - dimethyl-4-pyrazole carboxaldehyde, and 30 ml. of acetic anhydride was refluxed 20 minutes. The reaction mixture was chilled and the crude dye collected on a filter and washed with acetone. After recrystallization from ethyl alcohol, 1.7 g. (25%) of pure dye was obtained as amber crystals, M.P. 219–220° C., dec.

This dye containing a desensitizing imidazo[4,5-b]quinoxalinium salt nucleus shows excellent and improved properties as an electron acceptor and spectral sensitizer, as compared with the dye of Example A, for fogged direct positive photographic emulsions as indicated by the photographic tests in accordance with the procedure of Example 1. The results are listed in Table 1 hereinafter.

In place of the 1-(2-benzothiazolyl)-3,5-dimethyl-4-pyrazole carboxaldehyde in the above example, there can be substituted an equivalent molar amount of, for example, 1-(2-benzoxazolyl)-3,5-dimethyl - 4 - pyrazole carboxaldehyde, or 1-(2-benzoselenazolyl) - 3,5 - dimethyl-4-pyrazole carboxaldehyde to give the corresponding dyes of similar properties and utility.

EXAMPLE 5

1,3-diallyl-2-{[1-(2 - benzothiazolyl) - 3,5 - dimethyl-4-pyrazolyl]vinyl} - 6 - chloroimidazo[4,5-b]quinoxalinium p-toluenesulfonate

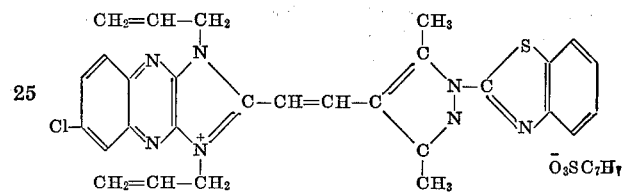

A mixture of 4.7 g. (1 mol.) of 1,3-diallyl-6-chloro-2-methylimidazo[4,5-b]quinoxalinium p - toluenesulfonate, 2.6 g. (1 mol.) of 1-(2-benzothiazolyl)-3,5-dimethyl-4-pyrazole carboxaldehyde, and 20 ml. of acetic anhydride was refluxed 15 minutes. The reaction mixture was chilled and the crude dye collected on a filter and washed with acetone. After recrystallization from methyl alcohol, 1.6 g. (22%) of pure dye was obtained as yellow crystals, M.P. 230–231° C., dec.

The above prepared dye containing a desensitizing imidazo[4,5-b]quinoxalinium salt nucleus was treated by the exact procedure of Example 1. The results are tabulated in Table 1 hereinafter. Referring to the table, it will be seen that this dye had a relative speed of 661, densities of 1.54 and 0.03 and maximum sensitivity at 515 m$\mu$, which results are far superior to those of comparison Example A having the corresponding values of 191, 1.50, 0.14 and 455 m$\mu$, respectively. Accordingly, this dye is well suited as an electron acceptor and spectral sensitizer for fogged direct positive photographic emulsions.

EXAMPLE 6

2-{[1-(2-benzothiazolyl)-3,5-dimethyl-4-pyrazolyl]vinyl} 3-ethyl-6-nitrobenzothiazolium p-toluenesulfonate

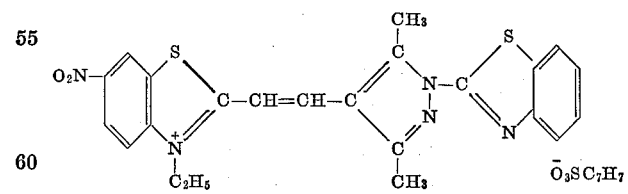

A mixture of 4 g. (1 mol.) of 3-ethyl-2-methyl-6-nitrobenzothiazolium p-toluenesulfonate, 2.6 g. (1 mol.) of 1-(2-benzothiazolyl)-3,5-dimethyl-4-pyrazole carboxaldehyde, and 20 ml. of acetic anhydride was refluxed 15 minutes. The reaction mixture was chilled and the crude dye collected on a filter and washed with acetone. After recrystallization from methyl alcohol, 0.95 g. (15%) of pure dye was obtained as brown needles, M.P. 249–250° C., dec.

This dye containing a desensitizing benzothiazolium salt nucleus was tested by the exact procedure of Example A. The results are listed in Table 1 hereinafter. It will be noted that this dye shows a relative speed of 525, densities of 1.57 and 0.03 and maximum sensitivity at 510 m$\mu$, as compared with comparison Example A having the corresponding values of 191, 1.50, 0.14 and 455 mµ. The dye of this example is, therefore, a relatively good to excellent electron acceptor and spectral sensitizer for fogged direct positive photographic silver halide emulsions.

In place of the 3-ethyl-2-methyl-6-nitrobenzothiazolium p-toluenesulfonate in the above example, there can be substituted an equivalent amount of, for example, 3-ethyl-2-methyl-6-nitrobenzoxazolium quaternary salt, e.g., the chloride, bromide, iodide, perchlorate, p-toluenesulfonate, etc., salt, or 3-ethyl-2-methyl-6-nitrobenzoselenazolium quaternary salt, e.g., the chloride, bromide, iodide, perchlorate, p-toluenesulfonate, etc., salt, and the like, to give the corresponding cyanine dyes having generally similar properties as electron acceptors and spectral sensitizers for direct positive and fogged direct positive photographic emulsions, for example, the dye 2-{[1-(2-benzothiazolyl) - 3,5 - dimethyl - 4 - pyrazolyl]vinyl}-3-ethyl-6-nitrobenzoxazolium p-toluenesulfonate, or the dye 2-{[1-(2 - benzothiazolyl) - 3,5 - dimethyl - 4 - pyrazolyl]vinyl} 3-ethyl-6-nitrobenzoselenazolium p-toluenesulfonate, and the like, or other salts of these dyes such as the chloride, bromide, iodide, perchlorate, etc.

The dyes prepared according to the above Examples 1 to 6, together with the comparison dye of Example A, as indicated previously, were photographically tested by the exact procedure described in Example 1 herein. The results are in Table 1 immediately below.

TABLE 1

| Example No. | Dye conc., g./mole silver | Relative white light clear speed | Maximum Density in unexposed areas | Minimum Density in exposed areas | Sensitizing max. (mµ) |
| --- | --- | --- | --- | --- | --- |
| 1 | 0.350 | 380 | 1.74 | 0.04 | 468 |
| 2 | 0.700 | 725 | 1.39 | 0.03 | 480 |
| 3 | 0.700 | 550 | 1.44 | 0.04 | 465 |
| 4 | 0.700 | 692 | 1.66 | 0.02 | 510 |
| 5 | 0.700 | 661 | 1.54 | 0.03 | 515 |
| 6 | 0.350 | 525 | 1.57 | 0.03 | 510 |
| A | 0.350 | 191 | 1.50 | 0.14 | 455 |

The following example illustrates the method for preparing a number of the pyrazole intermediates employed in the preceding examples to prepare the specified dye compounds.

EXAMPLE 7

1-(2-benzothiazolyl)-3,5-dimethyl-4-pyrazole carboxaldehyde

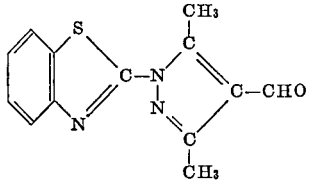

To a suspension of 64 g. (1 mol.) of 1-(2-benzothiazolyl)-3,5-dimethylpyrazole in 52 ml. of dimethylformamide, was added 33.5 ml. of phosphoryl chloride with shaking. The reaction mixture was heated at 150° for 16 hours, then cooled and suspended in 1500 ml. of water and made alkaline with sodium carbonate. The solid was collected on a filter and washed with water and then extracted with 1500 ml. boiling methyl alcohol. After chilling, the methyl alcohol solution filtered and the filtrate diluted with 1 l. of water. The solid which separated was collected on a filter and washed with water. A yield of 22.6 g. (31%) of colorless crystals were obtained, M.P. 118–120°.

The 1-(2-benzothiazolyl)-3,5-dimethylpyrazole for the above reaction was prepared as follows:

To a solution of 50 g. (1 mol.) of 2,4-pentanedione in 150 ml. of ethyl alcohol was added 82.5 g. (1 mol.) of 2-benzothiazolylhydrazine with shaking. The reaction mixture became warm and solid separated. After the addition was complete, the mixture was refluxed two hours. The reaction mixture was chilled and the solid collected on a filter and washed with ethyl alcohol. A yield of 114 g. (100%) was obtained. A sample was recrystallized from methyl alcohol for analysis; M.P. 146–147° C.

*Analysis.*—Calc'd for $C_{12}H_{11}N_3S$ (percent): C, 62.83; H, 4.84. Found (percent): C, 62.6; H, 5.1.

It will be evident from the foregoing that the procedure of above Example 7 can be used as a general method to prepare various other pyrazole intermediates defined by Formula III above. For example, in place of the 1-(2-benzothiazolyl)-3,5-dimethylpyrazole in the above example, there can be substituted an equivalent amount of, for example, 1-(2-benzoxazolyl)-3,5-dimethylpyrazole, or 1-(2-benzoselenazolyl)-3,5-dimethylpyrazole, etc. to give the corresponding pyrazole carboxaldehyde. In turn, the above intermediates can be prepared in general, by reacting 2,4-pentanedione or related alkanediones with the appropriate hydrazine derivatives as illustrated by the above example.

The preparation of fogged, direct positive photographic emulsions and elements with a number of the cyanine dyes of the invention is illustrated by the following example.

EXAMPLE 8

To 9.0 pounds of a silver chloride gelatin emulsion containing an equivalent of 100 grams of silver nitrate is added 0.017 gram of 2-{[1-(2-benzothiazolyl)-3,5-dimethyl-4-pyrazolyl]vinyl}3-ethylbenzothiazolium iodide (Example 1). The emulsion is coated on a non-glossy paper support, and is flashed with white light to give a density of 1.2 when developed in the following developer, diluted 1 part to 2 parts of water:

N-methyl-p-aminophenol sulfate: 3.1 grams.
Sodium sulfite, des.: 45 grams.
Hydroquinone: 12 grams.
Sodium carbonate, des.: 67.5 grams.
Potassium bromide: 1.9 grams.
Water to 1 liter.

The light fogged material can be exposed to an image with light modulated by a Wratten No. 15 filter to give a direct positive image. Similar results are obtained when the dye of Example 2 is substituted for 2-{[1-(2-benzothiazolyl) - 3,5-dimethyl-4-pyrazolyl]vinyl}-3-ethylbenzothiazolium iodide.

EXAMPLE 9

Seven pounds of a silver chloride gelatin emulsion containing the equivalent of 100 g. of silver nitrate is heated to 40° C. and the pH is adjusted to 7.8. Eight cc. of full strength (40%) formalin solution is added and the emulsion is held at 40° C. for 10 minutes. At the end of the holding period, the pH is adjusted to 6.0 and 0.125 g. of 1,3-diallyl-2-{[1-(2-benzothiazolyl) - 3,5 - dimethyl-4-pyrazolyl]vinyl}imidazo-[4,5-b]quinoxalinium p-toluenesulfonate (Example 4) is added. The emulsion is coated on a support, and provides good direct positive images. Similar results are obtained when the dye of Example 6 is substituted for the 1,3-diallyl-2{[1-(2-benzothiazolyl)-3,5 - dimethyl-4-pyrazolyl]vinyl}imidazo[4,5-b]quinoxalinium p-toluenesulfonate.

By substituting other dye compounds of the invention, as defined in Formula I above, into the procedure of the above Examples 8 and 9 generally similar fogged, direct positive photographic silver halide emulsions and photographic elements may be prepared.

The photographic silver halide emulsion and other layers present in the photographic elements made according to the invention can be hardened with any suitable hardener, including aldehyde hardeners such as formaldehyde, and mucochloric acid, aziridine hardeners, hardeners which are derivatives of dioxane, oxypolysaccharides such as oxy starch or oxy plant gums, and the like. The emulsion layers can also contain additional additives, particularly those known to be beneficial in photographic emulsions, including, for example, lubricating materials, stabilizers, speed increasing materials, absorbing dyes, plasticizers, and the like. These photographic emulsions can also contain in some cases additional spectral sensitizing dyes. Furthermore, these emulsions can contain color forming couplers or can be developed in solutions containing couplers or other color generating materials. Among the useful color formers are the monomeric and polymeric color formers, e.g., pyrazolone color formers, as well as phenolic, heterocyclic and open chain couplers having a reactive methylene group. The color forming couplers can be incorporated into the direct positive photographic silver halide emulsion using any suitable technique, e.g., techniques of the types shown in Jelley et al. U.S. Pat. 2,322,027, issued June 15, 1943; Fierke et al., U.S. Pat. 2,801,171, issued July 30, 1957, Fisher U.S. Pat. 1,055,155 and 1,102,028, issued Mar. 4, 1913 and June 30, 1914, respectively, and Wilmanns U.S. Pat. 2,186,849 issued Jan. 9, 1940. They can also be developed using incorporated developers such as polyhydroxybenzenes, aminophenols, 3-pyrazolidones, and the like.

Light sensitive photographic silver halide emulsions containing the novel dyes of this invention are claimed in my U.S. patent application Ser. No. 604,146 titled "Photographic Emulsions" filed concurrently with the instant application.

Although the invention has been described in considerable detail with particular reference to certain preferred embodiments thereof, it will be understood that variations and modifications can be effected within the spirit and scope of the invention as described hereinabove, and as defined in the appended claims.

I claim:

1. A cyanine dye selected from those represented by the following general formula:

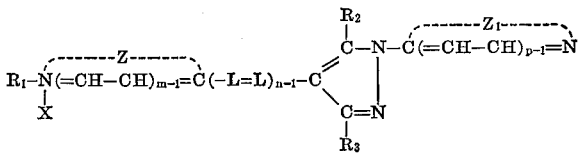

wherein $m$ and $p$ each represents a positive integer of from 1 to 2; $n$ represents a positive integer of from 2 to 3; L represents a methine linkage; $R_1$ represents a member selected from the group consisting of an alkyl group containing from 1 to 12 carbon atoms, cyclohexyl, a hydroxyalkyl group containing from 1 to 4 carbon atoms, an alkoxyalkyl group in which the alkoxy and alkyl moieties each containing from 1 to 4 carbon atoms, a carboxyalkyl group containing from 1 to 4 carbon atoms, a sulfoalkyl group containing from 1 to 4 carbon atoms, an acyloxyalkyl group in which the acyl group contains from 2 to 4 carbon atoms and the alkyl moiety contains from 1 to 4 carbon atoms, an alkoxycarbonylalkyl group in which the alkoxy and the alkyl moieties each contain from 1 to 4 carbon atoms, benzyl, phenethyl, a allyl group containing from 2 to 4 carbon atoms, phenyl, tolyl, xylyl, methoxyphenyl, chlorophenyl and naphthyl; $R_2$ and $R_3$ each represents a member selected from the group consisting of a hydrogen atom, an alkyl group containing from 1 to 12 carbon atoms, phenyl, tolyl, xylyl, methoxyphenyl, chlorophenyl and naphthyl; X represents an acid anion; $Z_1$ represents the non-metallic atoms required to complete a heterocyclic nucleus selected from the class consisting of a thiazole nucleus, an oxazole nucleus, a selenazole nucleus, a thiazoline nucleus, a pyridine nucleus, a quinoline nucleus, a 3,3-dialkylindolenine nucleus and an imidazole nucleus; and, Z represents the atoms necessary to complete a nucleus selected from those given for $Z_1$, an imidazo[4,5-b]quinoxazoline nucleus, a 3,3-dialkyl-3H-pyrrolo[2,3-b]pyridine nucleus and a thiazolo[4,5-b]quinoline nucleus.

2. A cyanine dye as defined by claim 1 wherein said $n$ is 2.

3. A cyanine dye as defined by claim 2 wherein said Z represents the atoms required to complete a thiazole nucleus.

4. A cyanine dye as defined by claim 2 wherein said Z represents the atoms required to complete an oxazole nucleus.

5. A cyanine dye as defined by claim 2 wherein said Z represents the atoms required to complete a selenazole nucleus.

6. A cyanine dye as defined by claim 6 wherein said Z represents the atoms required to complete a thiazoline nucleus.

7. A cyanine dye as defined by claim 2 wherein said Z represents the atoms required to complete a pyridine nucleus.

8. A cyanine dye as defined by claim 2 wherein said Z represents the atoms required to complete a quinoline nucleus.

9. A cyanine dye as defined by claim 2 wherein said Z represents the atoms required to complete a 3,3-dialkylindolenine nucleus.

10. A cyanine dye as defined by claim 2 wherein said Z represents the atoms required to complete an imidazole nucleus.

11. A cyanine dye as defined by claim 2 wherein said Z represents the atoms required to complete an imidazo[4,5-b]quinoxaline nucleus.

12. A cyanine dye as defined by claim 2 wherein said Z represents the atoms required to complete an 3,3-dialkyl-3H-pyrrolo[2,3-b]pyridine nucleus.

13. A cyanine dye as defined by claim 2 wherein said Z represents the atoms required to complete a thiazolo[4,5-b]quinoline nucleus.

14. A cyanine dye defined by claim 2 wherein said $Z_1$ represents the atoms required to complete a thiazole nucleus.

15. A cyanine dye defined by claim 2 wherein said $Z_1$ represents the atoms required to complete a benzothiazole nucleus.

16. A cyanine dye selected from the group consisting of 2-{[1-(2-benzothiazolyl) - 3,5 - dimethyl-4-pyrazolyl]vinyl}-3-ethylbenzothiazolium salt; 2-{[1 - (2-benzothiazolyl) - 3,5 - dimethyl-4-pyrazolyl]vinyl}-1,3,3-trimethyl-3H-indolium salt; 2-{[1-(2-benzothiazolyl)-3,5-dimethyl-4-pyrazolyl]vinyl}-1-ethylquinolinium salt; 1,3-diallyl-2-{[1-(2-benzothiazolyl) - 3,5 - dimethyl-4-pyrazolyl]vinyl} imidazo[4,5-b]quinoxalinium salt; 1,3 - diallyl-2-{[1-(2-benzothiazolyl) - 3,5 - dimethyl - 4 - pyrazolyl]vinyl}-6-chloroimidazo[4,5-b]quinoxalinium salt; and, 2-{[1-(2-benzothiazolyl) - 3,5 - dimethyl - 4 - pyrazolyl]vinyl}-3-ethyl-6-nitrobenzothiazolium salt.

References Cited
UNITED STATES PATENTS

| | | | |
|---|---|---|---|
| 2,211,762 | 8/1940 | Brooker | 260—240.1 |
| 2,646,409 | 7/1953 | Brooker et al. | 260—240.1 |
| 3,013,015 | 12/1961 | Plue | 260—310 |

FOREIGN PATENTS

| | | |
|---|---|---|
| 797,144 | 6/1958 | Great Britain. |

JOHN D. RANDOLPH, Primary Examiner

U.S. Cl. X.R.

96—102; 260—240, 288, 296, 298, 302. 304, 306, 307, 326.11